US006531016B1

(12) United States Patent
Weber et al.

(10) Patent No.: US 6,531,016 B1

(45) Date of Patent: Mar. 11, 2003

(54) PROCESS FOR THE REGION-WISE TRANSFER OF THE DECORATIVE LAYER OF A TRANSFER FOIL ONTO A SUBSTRATE AND A TRANSFER FOIL SUITABLE THEREFOR

(75) Inventors: Klaus Weber, Zirndorf (DE); Ludwig Brehm, Adelsdorf (DE)

(73) Assignee: Leonhard Kurz GmbH & Co., Furth (DE)

( * ) Notice: Subject to any disclaimer, the term of this patent is extended or adjusted under 35 U.S.C. 154(b) by 0 days.

(21) Appl. No.: 09/720,497

(22) PCT Filed: Apr. 22, 2000

(86) PCT No.: PCT/DE00/01302

§ 371 (c)(1), (2), (4) Date: Dec. 22, 2000

(87) PCT Pub. No.: WO00/68013

PCT Pub. Date: Nov. 16, 2000

(30) Foreign Application Priority Data

May 10, 1999 (DE) ........................................ 199 21 579

(51) Int. Cl.[7] ......................... B44C 1/165; B32B 31/14; B32B 15/08; B41M 3/12; B05D 3/06

(52) U.S. Cl. ....................... 156/230; 156/233; 156/234; 156/238; 156/247; 156/272.2; 156/289; 427/146; 427/208.2; 427/314; 427/457; 428/40.1; 428/42.1; 428/42.3; 428/200; 428/204; 428/347; 428/914

(58) Field of Search ................................ 156/230, 233, 156/234, 238, 240, 239, 241, 247, 277, 289, 320, 272.2, 273.7, 546, 541, 543, 580, 582, 583.3; 427/146, 147, 148, 457, 208.2, 314, 444; 428/40.1, 41.8, 42.1, 42.3, 195, 200, 202, 204, 207, 209, 343, 346, 347, 352, 914, 915

(56) References Cited

U.S. PATENT DOCUMENTS

| | | | | |
|---|---|---|---|---|
| 4,123,309 A | * | 10/1978 | Perrington et al. | 156/234 |
| 4,786,537 A | * | 11/1988 | Sasaki | 428/40 |
| 5,731,064 A | * | 3/1998 | Suss | 428/195 |
| 5,863,860 A | * | 1/1999 | Patel et al. | 503/227 |
| 5,882,463 A | * | 3/1999 | Tompkin et al. | 156/234 |
| 6,171,429 B1 | * | 1/2001 | Aindow et al. | 156/234 |
| 6,263,790 B1 | * | 7/2001 | Wyssmann et al. | 101/35 |

FOREIGN PATENT DOCUMENTS

| | | | | |
|---|---|---|---|---|
| DE | 4307487 A1 | | 10/1993 | |
| DE | 4313521 C1 | | 6/1994 | |
| EP | 0679532 A1 | | 11/1995 | |
| EP | 0741370 B1 | | 8/1998 | |
| EP | 0965446 A1 | | 12/1999 | |
| JP | 08101629 | | 4/1996 | |
| WO | WO 96/01187 | | 1/1996 | |
| WO | WO 96/37368 | * | 11/1996 | B41F/19/06 |

* cited by examiner

*Primary Examiner*—J. A. Lorengo
(74) *Attorney, Agent, or Firm*—Hoffmann & Baron, LLP

(57) ABSTRACT

Described is a process for the region-wise transfer of a decorative layer of a transfer foil, which includes an activatable adhesive layer from a carrier film onto a substrate, wherein the adhesive layer of the transfer foil is partially activated before the actual stamping operation, more specifically in such a way that the adhesive layer experiences activation only in the surface regions in which the decorative layer is to be transferred onto the substrate. A transfer foil which is particularly suitable for that process has an absorption layer in the surface regions of the decorative layer, which are to be transferred onto the substrate, which absorption layer absorbs the radiation energy causing activation of the adhesive layer and activates the adhesive layer under the action of the absorbed radiation energy.

19 Claims, 3 Drawing Sheets

PROCESS FOR THE REGION-WISE TRANSFER OF THE DECORATIVE LAYER OF A TRANSFER FOIL ONTO A SUBSTRATE AND A TRANSFER FOIL SUITABLE THEREFOR

BACKGROUND OF THE INVENTION

The invention concerns a process for the region-wise transfer of the decorative layer of a transfer foil, which decorative layer includes an adhesive layer which is activatable by radiation energy, from a carrier film for the decorative layer onto a substrate using a possibly heated stamping tool, wherein the adhesive layer is at least partially activated before the transfer foil passes into the stamping tool.

The invention further concerns a transfer foil which in particular is suitable for use in the transfer process according to the invention, which on a carrier film has a decorative layer which comprises a plurality of layer portions and which can be transferred region-wise onto a substrate under the action of pressure and possibly heat and whose surface that is remote from the carrier film is formed by an adhesive layer which is activatable by radiation energy.

When transferring the decorative layer of a transfer foil onto a substrate, it is necessary for the adhesive to be sufficiently activated in order to attain adequate adhesion of the decorative layer on the substrate. In that respect, the time required for activation of the adhesive layer quite crucially determines the speed of passage through the corresponding application machines.

In order to increase the machine speed, it is already known from WO 96/37368 for the heat-activatable adhesive layer of the decorative layer of a stamping or embossing foil to be preheated prior to the actual stamping or embossing operation in order in that way to at least partially activate the adhesive layer. In the known process—as usual—transfer of the decorative layer onto the substrate is effected in the regions in which the stamping tool acts on the stamping foil, while WO 96/37368 provides that the stamping tool is also heated. That procedure admittedly allows higher machine speeds to be attained. There is however the risk that, for example when the adhesive is excessively preheated, neat and clean region-wise application of the decorative layer to the substrate gives rise to difficulties because the decorative layer adheres to the substrate not only in the regions in which the stamping tool acts on the decorative layer but possibly also outside those regions, if the adhesive already has a sufficiently strong adhesion effect. That problem can occur in particular when using comparatively thick decorative layers, or decorative layers which are of a comparatively high level of mechanical stability and which for example have a metallisation thereon.

EP 0 741 370 B1 discloses a process for applying a security element to a substrate, in which the adhesive layer is brought into contact with the substrate and locally heated by the application of energy through the laminate structure, that is to say through the decorative layer, thereby seeking to provide that the decorative layer adheres to the substrate only at the heated locations, without any structures of the decorative layer being destroyed. In accordance with EP 0 741 370 B1, either laser radiation or light sources are used for the supply of energy. A laser beam can be guided in accordance with the desired pattern. When using light sources, the procedure involved has recourse either to masks or to exposure with addressable arrays consisting of laser or light emitting diodes. That known process certainly has the advantage that a very neat and clean and nonetheless only region-wise transfer of the decorative layer of a transfer foil from the carrier film of the transfer foil onto a substrate is possible, while the use of pressure in implementing transfer onto the substrate is substantially eliminated, to provide for careful treatment of the structures which are possibly present in the decorative layer. A disadvantage of that known procedure however is that comparatively low operating speeds must be reckoned to apply. When using masks or diode arrays, it even necessary under some circumstances to move the transfer foil and the substrate with a stepwise movement so that the mask or the array is stationary relative to the transfer foil, during the time required for activation of the adhesive layer.

SUMMARY OF THE INVENTION

Now, the object of the invention is to propose a process and a transfer foil which is suitable in particular for carrying out that process, with which there is on the one hand the possibility of increasing the machine speed by pre-activation of the adhesive layer, but at the same time also ensuring that neat and clean transfer of the decorative layer of the transfer foil also occurs only in the regions which are actually to be transferred.

In accordance with the invention, to attain that object, it is proposed that the process of the general kind set forth is so developed that before the transfer foil passes into the stamping tool the adhesive layer is activated by means of radiation energy only in the surface regions in which the decorative layer is to be transferred onto the substrate by means of the stamping tool.

In contrast to the teaching of WO 96/37368 in which pre-heating of the adhesive layer of the transfer foil is effected over substantially the entire surface area before it passes into the stamping tool, the present invention proposes that pre-heating—similarly to the basic proposal of EP 0 741 370 B1—is effected only in a region-wise manner, in which respect however it is important that in actual fact preheating takes place before passing into the stamping tool. The process according to the invention therefore involves operating not only with activation of the adhesive but at the same time also by means of a suitable stamping tool, that is to say using suitable pressure.

By virtue of the additional application of pressure, it can very frequently be provided that a comparatively low level of radiation energy is already sufficient to pre-activate the adhesive to such an extent that the machine speed can be substantially increased. At the same time, region-wise pre-activation of the adhesive layer ensures that neat and clean region-wise stamping occurs, because the working conditions can be easily selected in such a fashion that the decorative foil adheres by way of the adhesive layer to the substrate only where the adhesive layer was actually also preheated.

It is particularly advantageous if the process according to the invention involves using a transfer foil whose decorative layer has an absorption layer only in the surface regions to be transferred onto the substrate, which absorption layer absorbs the radiation energy for effecting activation of the adhesive layer.

The transfer foil is therefor advantageously such that, in the surface regions to be transferred, it includes an additional layer portion, namely the absorption layer. Pre-activation of the adhesive layer then occurs only in the region of that absorption layer which suitably absorbs the radiation energy—and which naturally must be transferred to the adhesive layer—, wherein it is possible in that way, without involving particular apparatus complication and expenditure, to provide that the adhesive layer is pre-activated in actual fact only in the regions that are wanted. In particular, it is possible in accordance with the invention to eliminate the use of especially guided laser beams, as well as masks or diode arrays which are provided in accordance with EP 0 741 370 B1.

The effect of region-wise activation can be further improved in particular in the case of a transfer foil whose decorative layer is provided region-wise with an absorption layer, if the radiation energy for activating the adhesive layer acts on the decorative layer only in the surface regions which are intended for transfer onto the substrate, wherein the radiation energy for activating the adhesive layer advantageously acts by way of a mask or the like only on the surface regions of the decorative layer and adhesive layer, which are to be transferred onto the substrate.

In principle, it is possible to envisage using all possible kinds of activation of the adhesive layer. However, a procedure which is thought to be particularly desirable and thus of particular significance in a practical context is a procedure which involves using an adhesive layer which is activatable by means of thermal radiation, that is to say a so-called hot melt adhesive which softens and becomes sticky under the effect of heat.

Particularly when using a heat-activatable adhesive layer, it may be desirable to use laser radiation for activation purposes, in which case the laser radiation can possibly be deflected in accordance with the surface regions to be transferred. The use of laser radiation affords the advantage that it is possible to achieve very short heating times if the laser energy which acts is sufficiently high.

Finally, in accordance with the process of the invention, it is provided that the adhesive layer of the decorative layer is only pre-activated before the transfer layer passes into the stamping tool and a heated stamping tool serves for complete activation of the adhesive layer. That procedure permits comparatively high machine speeds. In that respect, the stamping tool may act over a large surface area or the entire surface area, or it may also act only in the regions in which the layer portions forming the decorative layer are to be transferred onto the substrate.

The invention further concerns a transfer foil, preferably a hot stamping foil, which is suitable in particular but not exclusively for the above-discussed process. This transfer foil which on a carrier or backing film has a decorative layer which comprises a plurality of layer portions and which can be transferred in a region-wise manner onto a substrate under the action of pressure and possibly heat and whose surface that is remote from the carrier film is formed by an adhesive layer which is activatable by radiation energy is distinguished in accordance with the invention in that the decorative layer has an absorption layer only in predetermined surface regions which are intended for transfer onto the substrate, which absorption layer absorbs the radiation energy causing activation of the adhesive layer.

The particularity of the transfer foil according to the invention is therefore that present in the decorative layer in a region-wise manner is an absorption layer which serves to absorb radiation energy serving for activation of the adhesive layer and in that way to provide for activation of the adhesive layer.

When a transfer foil of that kind is used in the process discussed in the opening part of this specification, it is particularly easy to achieve a clean and neat definition of the regions of the decorative layer, which are to be transferred. The transfer foil according to the invention however can also be used—independently of the discussed process—by for example the adhesive layer being activated exclusively by way of the absorption layer. In a transfer foil of that kind, comparatively finely structured regions can be provided with the absorption layer. Even when the procedure involves irradiation over a large surface area and the use of stamping tools of large surface area, that nonetheless provides that in actual fact only the regions of the decorative layer, which are associated with the absorption layer, are transferred onto the substrate. When using a transfer foil in accordance with the invention therefore the effect that EP 0 741 370 B1 seeks to attain can be achieved with very simple means, while in particular there is no need in each case for the stamping apparatus used for transferring the decorative layer onto the substrate to be adapted to the specific configuration of the regions of the decorative layer, which are to be transferred.

In order to provide for a particularly good action of the radiation energy absorbed in the absorption layer, on the adhesive layer, it is desirable if the absorption layer is provided immediately adjoining the adhesive layer of the decorative layer.

It will be appreciated that the pigments or other additives which the absorption layer must contain in order to be able to suitably absorb the radiation energy do not always comply with the requirements in regard to the graphic or optical configuration of the decorative layer. If operation is implemented with thermal radiation, for example IR-radiation, the absorption layer contains generally dark, optically unattractive pigments or the like. Here it is desirable if, in accordance with the invention, the decorative layer, on the side of the absorption layer which faces towards the carrier film, has an opaque decorative layer portion which covers over the absorption layer after transfer of the decorative layer onto a substrate and which is desirably a reflection layer preferably having a structure with an optical diffraction effect, in particular a metal layer. Particularly when the arrangement has a reflection layer having a structure with an optical-diffraction effect, highly attractive graphical configurational arrangements can be embodied.

When the arrangement includes a reflection layer for covering over the absorption layer, which in use in fact forms the exposed surface of the decorative layer, it is desirable if the surface of the decorative layer, which faces towards the carrier film, is formed by a transparent protective lacquer layer, that is to say in other words the reflection layer is covered over by such a protective lacquer layer. A protective lacquer layer of that kind improves mechanical resistance and affords protection in particular for any structures having an optical-diffraction effect, which may be present, that is to say very fine structures.

In the multiplicity of situations of use of a transfer foil according to the invention it will be desirable if the absorption layer absorbs thermal radiation while the adhesive layer is formed by a heat-activatable material which is transmissive for the thermal radiation absorbed by the absorption layer. That configuration is desirable in particular when a reflection layer is present on the side of the decorative layer which is visible in use, the reflection layer preventing penetration of the radiation serving for activation purposes.

If in such a case the adhesive layer is transmissive for the thermal radiation absorbed by the absorption layer, irradiation of the transfer foil can be effected from the adhesive side. That also has the advantage that the radiation is then not unnecessarily weakened by the carrier film. The structure having a transparent adhesive layer and an absorption layer which is separate therefrom also affords the technical advantage that the adhesion effect of the adhesive layer is not adversely affected by the additives which are possibly present in the absorption layer.

In terms of practical implementation, it seems desirable if the absorption layer is formed by a lacquer layer containing the pigments which absorb the radiation energy serving for activation of the adhesive layer. The pigments that can be considered are for example carbon black, black or dark pigments etc. When using a heat-activatable adhesive layer, operation is more appropriately effected with infrared radiation for activation purposes, in which case then the arrangement is preferably such that the absorption layer absorbs infrared radiation of a wavelength for which the adhesive layer transmissive.

BRIEF DESCRIPTION OF THE DRAWINGS

Further features, details and advantages of the invention will be apparent from the description hereinafter of preferred embodiments of the transfer foil and the process, with reference to the drawing in which.

DESCRIPTION OF THE PREFERRED EMBODIMENTS

Figure 1A:
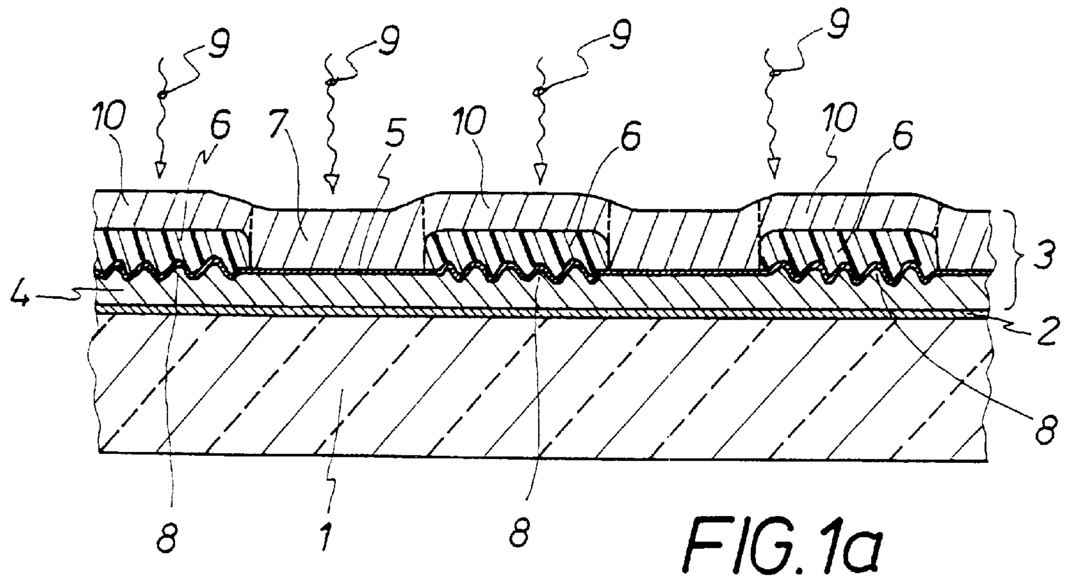
FIG. 1*a* is a diagrammatic view in section through a part of a transfer foil.

The transfer foil diagrammatically shown in FIG. 1*a* involves a foil which in its fundamental structure corresponds to a conventional hot stamping foil, as can be used for example for producing security features on bank notes, value-bearing papers, stocks and shares or the like, wherein for that purpose the hot stamping foil has on the one hand a metallisation and on the other hand a spatial structure with an optical-diffraction effect.

The transfer foil as shown in FIG. 1*a* includes in the usual manner a carrier or backing film 1, for example a polyester film of a thickness of between 10 and 25 μm. Disposed on that carrier film 1 is a per se known release layer 2 which, particularly under the effect of heat, is intended to facilitate detachment of the decorative layer generally identified by reference numeral 3 from the carrier film 1. The release layer 2 is usually applied over the full surface area.

In the illustrated embodiment, the decorative layer 3 comprises four layer portions, more specifically a transparent protective lacquer layer 4, a metal layer 5 which is usually applied thereto by a vapour deposition procedure, an absorption layer 6 provided in region-wise manner, and an activatable adhesive layer 7, in which respect it is to be assumed that the adhesive layer 7 is a hot adhesive layer. The protective lacquer layer 4 and the hot adhesive layer 7 and the metallisation 5 are each provided over the full surface area involved, in the embodiment shown in FIG. 1*a*.

As already mentioned, the foil shown in FIG. 1*a* is a foil which serves for example for the production of security elements. For that purpose, in the regions of the absorption layer 6, the foil is provided with a spatial structure 8 having an optical-diffraction action.

Figure 1B:
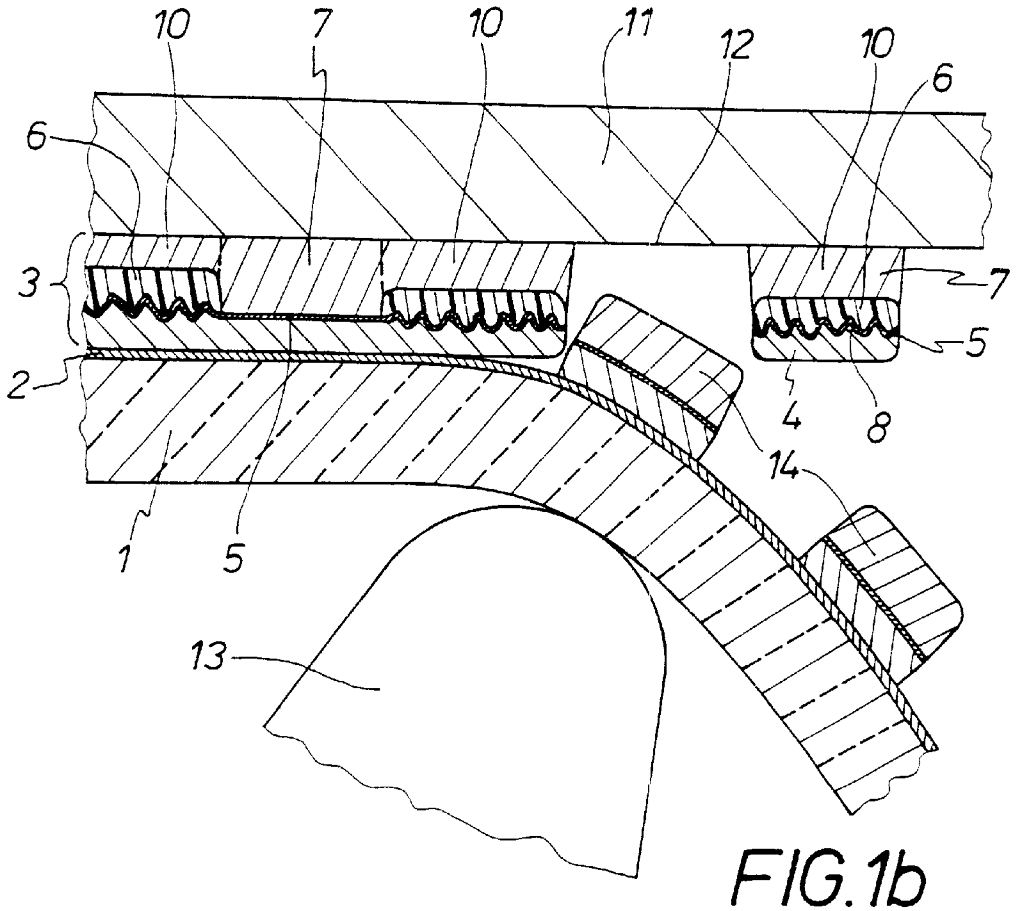
FIG. 1*b* is a diagrammatic view in section of the transfer operation using a foil as shown in FIG. 1*a,*

The foil as shown in FIG. 1*a* which is also used in FIG. 1*b* is produced as follows:

First of all, the release layer 2 which covers the full surface area is applied to the carrier film 1, with the thickness of the release layer 2 being between about 0.01 and 0.1 μm, using a printing or coating or spreading process.

The protective lacquer layer 4 is then also applied over the full surface area involved, with a layer thickness of between 0.8 and 2.5 μm, preferably between 1.2 and 1.7 μm.

The transparent protective lacquer 4 has the property that it can be suitably structured by means of suitable stamping or embossing tools, so-called dies. As the next step, the spatial structure 8 is embossed into the free surface of the protective lacquer 4, in a replication process. Corresponding structures which have an optical-diffraction effect or a diffractive effect are generally known and are described for example in EP 0 741 370 B1.

After the spatial structure 8 has been formed, the whole of the free surface of the protective lacquer layer 4 is then provided with a metallisation 5. In general vacuum vapour deposition is effected using aluminium, with layer thicknesses of between 5 and 200 nm.

After vapour deposition of the metallisation 5, the absorption layer 6 which is present only in a region-wise manner is then applied to the metallisation 5 in the regions in which the decorative layer 3 is to be transferred onto a substrate. Desirably, the absorption layer 6 is an activatable decorative lacquer which is applied in a layer thickness of between 0.8 and 2.8 μm, preferably 1.5 μm. It is desirable for the absorption layer 6 to be applied in register relationship with the structuring 8, as is indicated in FIG. 1*a*.

Then, the last step is application of the adhesive layer 7 over the full surface area involved, in which case a material which is transmissive for infrared radiation is desirably used for the adhesive layer 7 if the absorption layer 6 is capable of correspondingly absorbing infrared radiation. The adhesive layer 7 is applied in a layer thickness of between 2 and 10 μm, preferably between 3 and 5 μm.

The individual layers can be of the following compositions:

| Example | |
|---|---|
| Release layer 2<br>(layer thickness between about 0.01 and 0.1 μm) | |
| Ethanol | 100 g |
| Toluene | 900 g |
| Ester wax (dropping point 90° C.) | 3 g |
| Protective lacquer layer 4<br>(layer thickness between 0.8 and 2.5 μm, preferably between 1.2 and 1.7 μm) | |
| MEK | 400 g |
| Toluene | 150 g |
| Cyclohexanone | 200 g |
| Cellulose nitrate (low-viscosity, 65% in alcohol) | 140 g |
| Butyl-/methylmethacrylate (d = 1.05 g/cm3, acid number between 7 and 9 mg KOH/g) | 100 g |
| Absorption layer 6<br>(layer thickness between 0.8 and 2.8 μm, preferably 1.5 μm) | |
| MEK | 270 g |
| Toluene | 360 g |

-continued

| Example | |
|---|---|
| Acetone | 150 g |
| PVC/PVAC-mixed polymer (K-value: 43) | 135 g |
| High-molecul. dispersing additive | 13 g |
| Silicic acid | 4 g |
| Extender (aluminium silicate) | 22 g |
| IR-activatable pigment | 46 g |
| (Flame soot, Pigment Black 7) | |
| Adhesive layer 7 | |
| (layer thickness between 2.0 and 10.0 μm, | |
| preferably between 3.0 and 5.0 μm) | |
| MEK | 280 g |
| Toluene | 350 g |
| PVC/PVAC-copolymer (mp 80° C.) | 210 g |
| Thermoplastic polyurethane | 130 g |
| (d = 1.18 g/cm3) | |
| Silicic acid, hydrophobised | 60 g |
| (particle size about 10 μm) | |

The purpose of the absorption layer 6 of the transfer foil shown in FIG. 1*a* is to absorb radiation energy which impinges on the decorative layer 3 of the foil (as diagrammatically indicated by the arrows 9) and to give off the radiation energy which is then stored, to the adhesive layer 7, in the regions 10 adjoining the absorption layer 6, in order in that way to activate or at least pre-activate the adhesive 7 in the regions 10 so that, after irradiation of the decorative layer 3 as indicated by the arrows 9 the adhesive layer 7 is already sticky in the regions 10.

The diagrammatic view in FIG. 1*b* shows how a foil as shown in FIG. 1*a* can be transferred onto a substrate 11. In this case, for reasons of simplicity, the Figure does not show the way in which the transfer foil is applied to the surface 12 of the substrate 11, which is to be decorated. That can be implemented for example by a heated or unheated stamping roller which at any event can provide for a contact pressure effect over a large surface area.

Before the transfer foil 1, 3 is applied to the surface 12 of the substrate 11 the decorative layer 3 of the transfer foil is subjected to the action of radiation energy as shown in FIG. 1*a,* the radiation energy being absorbed in the absorption layer 6 and at least pre-activating the adhesive layer 7 in the regions 10.

The effect of this is that, as shown in the right-hand half of FIG. 1*b,* the adhesive layer 7 adheres to the surface 12 of the substrate 11 in the activated regions 10 and thereby simultaneously causes the corresponding absorption layer 6, the spatial structure 8 with the metallisation 5 and the protective lacquer layer 4 to adhere to the substrate 11, in the associated region.

In contrast, the regions of the decorative layer 3 which are not coincident with the pre-activated regions 10 of the adhesive layer 7 are not held fast to the surface 12 of the substrate 11. When then the carrier film 1 is guided away from the substrate 11 over the release or detachment finger 13, the decorative layer 3 remains adhering to the carrier film 1 outside the regions 10 by way of the release layer 2 and in that way is taken away from the substrate 11 in the form of the decorative layer residues 14. That therefore gives a substrate 11 which is correspondingly provided with the decorative layer 3 only in a region-wise manner at the surface 12 thereof.

Figure 2A:
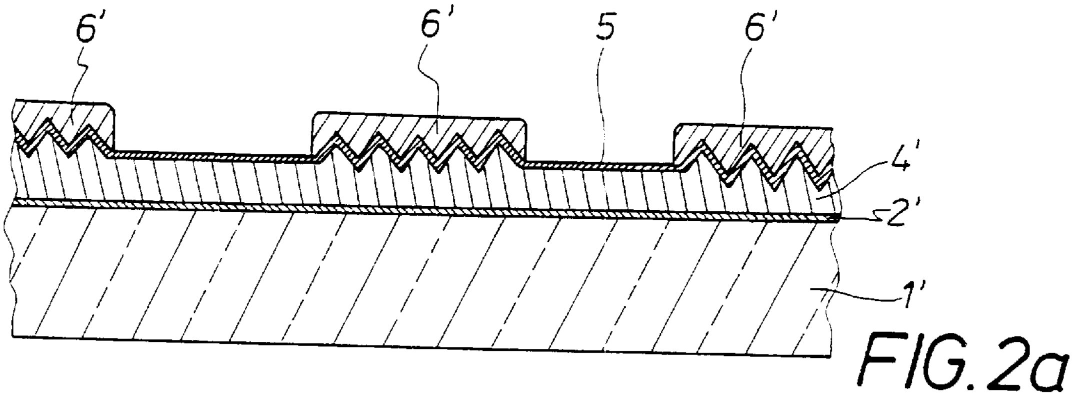
FIGS. 2*a* to 2*c* diagrammatically show a special production process by means of a partial section through a transfer foil, and FIG. 3 diagrammatically shows an apparatus, and a process in transferring the decorative layer from a transfer foil onto a substrate.
Figure 2B:
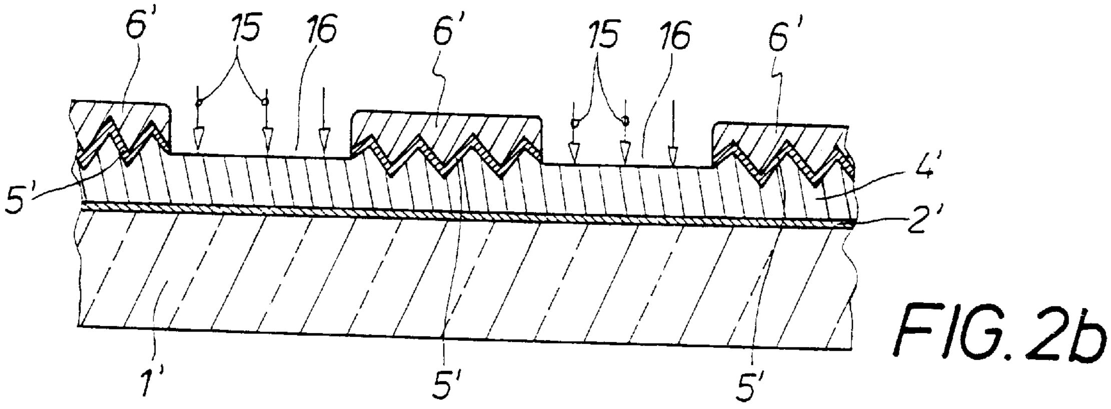
Figure 2C:
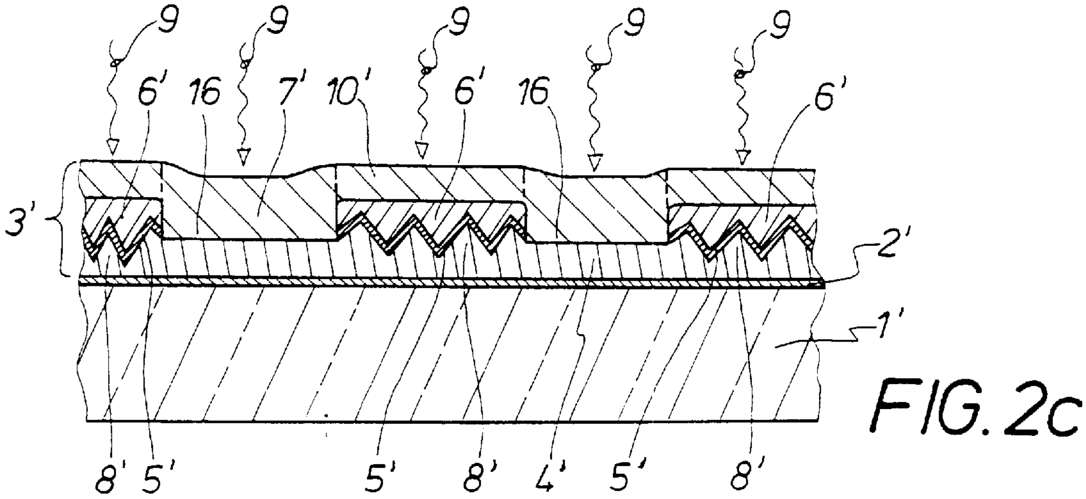

FIG. 2*c* shows a hot stamping foil which essentially corresponds to FIG. 1*a* but which differs from the transfer foil shown in FIG. 1*a* in that the metallisation 5' is present only in the regions in which there is also a spatial structure 8'. The foil shown in FIG. 2*c* is therefore a so-called partly metallised foil. The foil shown in FIG. 2*c* also includes a carrier or backing film 1', a release layer 2', a transparent protective lacquer layer 4', an absorption layer 6' which is provided only in a region-wise manner, and an adhesive layer 7' which covers the entire surface area. The foil shown in FIG. 2*c* is particularly suitable for certain areas of use, as a result of its partial metallisation only in the regions of the spatial structure 8'. For example it is possible for the partial metallisation to be such that, after the decorative layer 3' of the foil shown in FIG. 2*c* has been applied to a substrate on the one hand the optical effect produced by the spatial structuring 8', for example a holographic effect or a colour change effect, is clearly visible, but on the other hand the background which is formed by the substrate surface and the patterning of the background still remain perceptible. It is possible in that way to still see for example a photograph, alphanumeric characters or the like on the substrate, although the partly metallised decorative layer 3' is present in the same region.

Production of the transfer foil, in particular the hot stamping foil, as shown in FIG. 2*c*, is effected using a special lacquer for the absorption layer 6'. More specifically, in the embodiment of FIG. 2 the absorption layer 6' performs at the same time the function of a resist lacquer which permits the metal layer 5 to be etched away in the regions which are not covered by the absorption layer 6'.

In production of the foil as shown in FIG. 2*c*, the procedure, as illustrated in FIG. 2*a*, in conformity with the production process for the foil shown in FIG. 1*a,* firstly comprises applying to a carrier film 1' of similar thickness and nature, as referred to in connection with FIG. 1*a,* a release layer 2' of the usual layer thickness of between 0.01 and 0.1 μm. That is then followed by application over the entire surface area of the protective lacquer 4', possibly replication of the structure 8', and finally metallisation by vapour deposition with aluminium, all as described with reference to FIG. 1*a*.

The absorption layer 6' is then applied by printing to the metallisation 5 only in the regions in which the metal layer 5' is to be retained, corresponding to the description set forth in relation to FIG. 1*a.*

The absorption layer 6' is of such a composition that it is suitable for a subsequent etching operation. After suitable hardening of the absorption layer 6' the regions of the aluminium layer or metallisation 5 which are not covered by the absorption layer 6' serving as a resist lacquer are then etched. The etching operation can be carried out by using a bath comprising 5% caustic soda solution, at a bath temperature of between 20 and 50° C. The etching operation is indicated by the arrows 15 in FIG. 2*b.*

After the metal has been etched away in the regions 16 between the structured regions 8' or the regions covered by the absorption layer 6', the corresponding surface of the foil is washed, dried and then the adhesive layer 7' is applied over the entire surface area.

It will be appreciated that in principle it is possible for the composition of the various layer portions, more specifically the release layer 2, the protective lacquer layer 4, the absorption layer 6 and the adhesive layer 7, to be selected and varied to adapt same to the respective purposes of use involved. It is to be pointed out however that the compositions set forth in the Example for the various layer portions can also be used when the absorption layer as shown in FIGS. 2*a* to 2*c* is simultaneously to perform the function of a resist layer for the operation of etching away the metallisation. It can therefore be assumed that the various layers 2, 2'; 4, 4'; 6, 6' and 7, 7' in the embodiments of FIG. 1*a* and FIGS. 2*a* to 2*c* on the other hand are of a substantially identical composition.

Use of the foil of the second embodiment as shown in FIG. 2*c* substantially corresponds to the mode of use of the foil of FIG. 1*a*, which is set forth by way of example with reference to FIG. 1*b*.

Reference will now be made to FIG. 3 to describe once again the way in which apparatuses for applying corresponding transfer foils to a substrate can in principle be designed.

Figure 3:
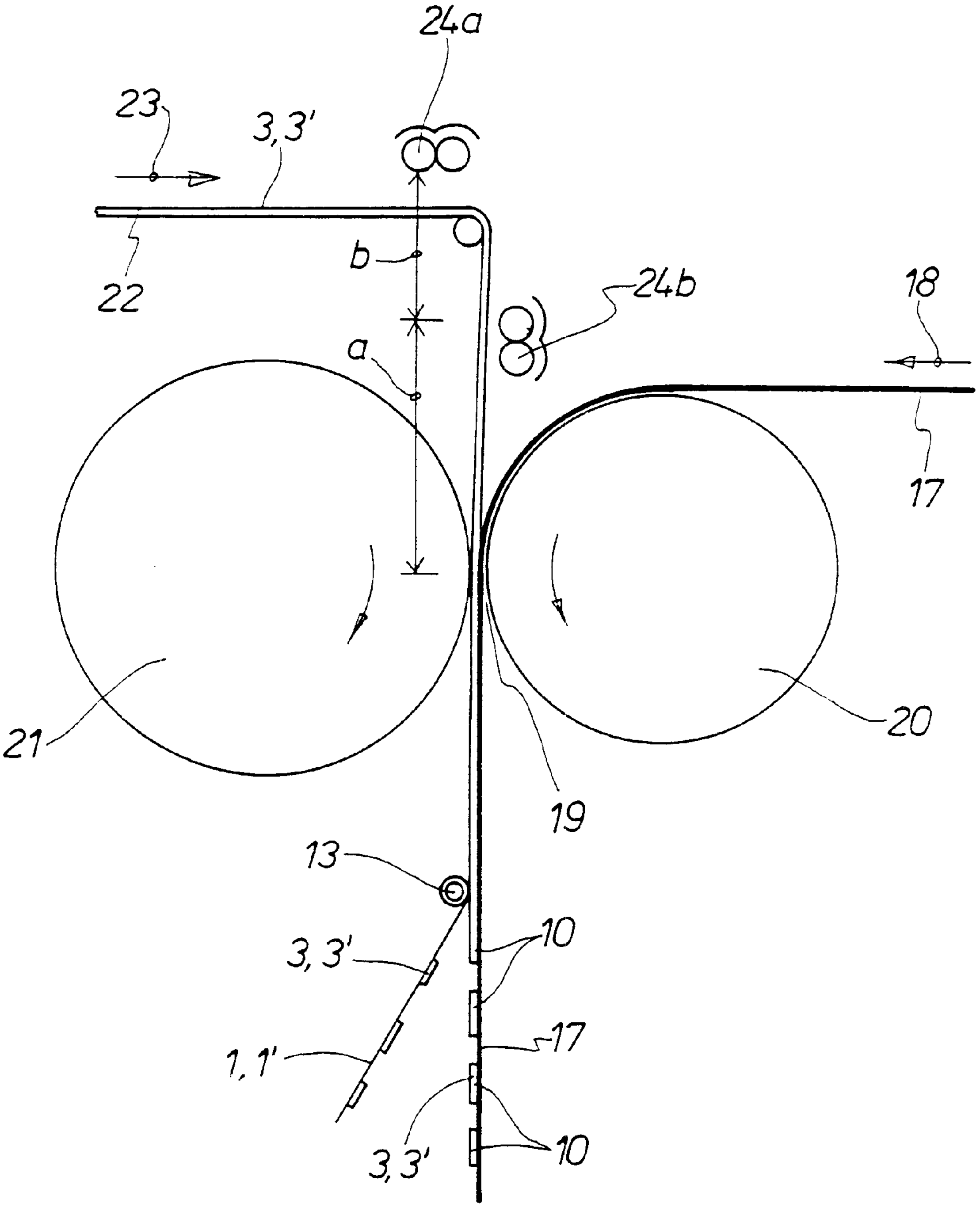

The apparatus shown in FIG. 3 is an apparatus for continuously decorating a substrate, for example a paper web 17 which is fed from a supply roll (not shown) or in the form of sheets from a stack in the direction of an arrow 18 to a gap 19 between a counterpressure or backing roller 20 and the actual stamping cylinder 21 which is assumed to have a full surface and which for example can be heated to a temperature of between 80 and 120° C.

At the same time, a transfer foil 22 is introduced into the gap 19, the transfer foil 22 being unwound in the direction indicated by the arrow 23 from a supply roll which is also not shown in FIG. 3.

In the gap 19, the decorative layer 3, 3' of the transfer foil 22 is pressed against the substrate, for example the paper web 17, under the action of the stamping roller 21 and the backing roller 20 and, if the adhesive layer of the transfer foil 22 is suitably activated, transferred onto the surface of the paper web 17, which faces towards the transfer foil 22.

Downstream of the gap 19, the carrier film 1, 1' is then guided away from the substrate 17 with the assistance of a release or detachment finger 13 (see FIG. 1*b*), in which case the decorative layer 3, 3' adheres to the substrate 17 in the regions in which corresponding activation of the adhesive layer 7, 7' has occurred, while in the regions therebetween, the decorative layer 3, 3' remains adhering to the carrier film 1, 1' and is removed therewith so as to provide for corresponding region-wise decoration of the substrate surface (see FIG. 1*b*).

Hitherto, the procedure involved in region-wise transfer of a decorative layer from a transfer foil onto a substrate was generally such that the stamping cylinder has correspondingly projecting structures or patterning configurations, in the regions in which the original is to be transferred onto the substrate. Preheating of the transfer foil 22 can be effected by means of suitable radiating devices before passing into the stamping gap 19, as described in WO 96/37368.

The apparatus shown in FIG. 3 also has radiating devices 24*a* and 24*b* of that kind. The radiating devices are desirably infrared radiating devices, in which respect it has been found in practice that for example double radiating devices of type SMBG 2600/150 G from Heraeus/Hanau are highly suitable, both the passages thereof being heated and provided with a gold reflector. The output power of the radiation devices can be for example around 1,000 W.

In order to achieve suitable pre-activation of the adhesive layer of a composition in accordance with the above-described embodiment, the radiating devices will advantageously be disposed at a spacing of between 20 and 40 mm from the transfer foil, more specifically on the side of the foil which carries the decorative layer 3, 3'. As the adhesive layer 7, 7' is transparent in relation to infrared radiation, it is possible in that way, even if the foil has partial or complete metallisation, to provide that a very high proportion of the radiation is absorbed in the absorption layer 6. The precise spacing of the IR-radiating devices from the transfer foil has to be established on the basis of suitable tests—depending on the precise composition of the adhesive layer and the surface nature of the substrate to be decorated.

As FIG. 3 shows, two IR-radiating devices 24*a* and 24*b* are disposed in succession (in the direction of movement of the transfer foil 22), in which respect the arrangement is advantageously such that the second radiating device 24*b* is at a spacing a of between 40 and 70 mm from the gap 19 between the stamping cylinder 21 and the backing cylinder 20. The first radiating device 24*a* should advantageously be arranged at a spacing b of about 40 mm in the direction of movement of the transfer foil 22, upstream of the second radiating device 24*b*.

Tests have shown that, with an apparatus corresponding in principle to the view in FIG. 3 and using the layer compositions as set forth in the foregoing Example and when using and arranging the radiating devices 24*a* and 24*b* in the above-described manner, it is possible to achieve very good results when transferring a decorative layer 3, 3' onto a substrate. It is possible in particular to achieve comparatively high working speeds of up to 120 m/min when using an embossing cylinder which has a full surface, being heated to 120° C. A further advantage in this respect is that detachment of the carrier film 1, 1' with the residues of the decorative layer 3, 3' from the substrate is possible without effecting previous cooling, that is to say without using a special cooling roller.

It will be appreciated that it is possible to envisage many modifications of the basic principle of the invention, in particular in regard to region-wise activation and in regard to the stamping or embossing devices used when carrying out the process. For example, it would be conceivable, in the case of the embodiment shown in FIG. 3, to operate with a suitably structured stamping or embossing cylinder which acts on the decorative layer only in the regions which are to be transferred.

What is claimed is:

1. A process for the region-wise transfer of the decorative layer of a transfer foil, which decorative layer includes a plurality of surface regions and an adhesive layer which is activatable by radiation energy, from a carrier film for the decorative layer onto a substrate using a heated or unheated stamping tool, wherein the adhesive layer is at least partially activated before the transfer foil passes into the stamping tool, characterized in that before the transfer foil passes into the stamping tool the adhesive layer is activated by means of radiation energy which acts on the adhesive layer only in the surface regions in which the decorative layer is to be transferred onto the substrate by means of the stamping tool.

2. A process for the region-wise transfer of the decorative layer of a transfer foil, which decorative layer includes a plurality of surface regions and an adhesive layer which is activatable by radiation energy, from a carrier film for the decorative layer onto a substrate using a heated or unheated stamping tool, wherein the adhesive layer is at least partially activated before the transfer foil passes into the stamping tool, characterized in that before the transfer foil passes into the stamping tool the adhesive layer is activated by means of radiation energy only in the surface regions in which the decorative layer is to be transferred onto the substrate by means of the stamping tool, and wherein the decorative layer has an absorption layer only in the surface regions which are to be transferred onto the substrate, which absorption layer absorbs the radiation energy which causes activation of the adhesive layer.

3. A process according to claim 1 characterized in that an adhesive layer which is activatable by means of heat radiation is used.

4. A process according to claim 1 characterized in that before the transfer foil passes into the stamping tool the adhesive layer of the decorative layer is only pre-activated and a heated stamping tool serves for complete activation of the adhesive layer.

5. A process according to claim 2 characterized in that an adhesive layer which is activatable by means of heat radiation is used.

6. A process according to claim 2 characterized in that before the transfer foil passes into the stamping tool the adhesive layer of the decorative layer is only pre-activated and a heated stamping tool serves for complete activation of the adhesive layer.

7. A transfer foil, which on a carrier film has a decorative layer which comprises a plurality of layer portions and which can be transferred region-wise onto a substrate under the action of pressure and optionally heat and whose surface that is remote from the carrier film is formed by an adhesive layer which is activatable by radiation energy characterized in that the decorative layer has an absorption layer only in predetermined surface regions which are intended for thermal transfer onto the substrate, which absorption layer absorbs the radiation energy which causes activation of the adhesive layer.

8. A transfer foil according to claim 7 characterized in that the absorption layer is provided immediately adjoining the adhesive layer.

9. A transfer foil according to claim 7 characterized in that on the side of the absorption layer which faces towards the carrier film the decorative layer has an opaque decorative layer portion which covers over the absorption layer after transfer of the decorative layer onto the substrate.

10. A transfer foil according to claim 9 characterized in that decorative layer portion is a reflection layer preferably having a structure with an optical-diffraction effect, in particular a metal layer.

11. A transfer foil according claim 7 characterized in that the surface of the decorative layer which faces towards the carrier film is formed by a transparent protective lacquer layer.

12. A transfer foil according to claim 7 characterized in that absorption layer absorbs thermal radiation while the adhesive layer is formed by a heat-activatable material which is transmissive for the thermal radiation absorbed by the absorption layer.

13. A transfer foil according to claim 7 characterized in that the absorption layer is formed by a lacquer layer containing pigments which absorb the radiation energy which serves to activate the adhesive layer.

14. A transfer foil according to claim 12 characterized in that the absorption layer absorbs infrared radiation of a wavelength for which the adhesive layer is transmissive.

15. A transfer foil according to claim 12 characterized in that the absorption layer contains pigments which absorb thermal radiation, in particular infrared radiation, preferably carbon black or other dark pigments.

16. A transfer foil according to claim 10, wherein the surface of the decorative layer which faces towards the carrier film is formed by a transparent protective lacquer layer.

17. A transfer foil according to claim 16, wherein the absorption layer absorbs thermal radiation while the adhesive layer is formed by a heat-activatable material which is transmissive for the thermal radiation absorbed by the absorption layer.

18. A transfer foil according to claim 7, wherein the absorption layer is formed by a lacquer layer containing pigments which absorb the radiation energy which serves to activate the adhesive layer.

19. A transfer foil according to claim 14, wherein the absorption layer contains pigments which absorb thermal radiation, in particular infrared radiation, preferably carbon black or other dark pigments.

* * * * *